United States Patent

Barras

[11] 3,930,388
[45] Jan. 6, 1976

[54] LOCKING APPARATUS FOR A GASOLINE FILLER PIPE

[76] Inventor: Paul E. Barras, 20203 Cohasset St. Apt. 8, Canoga Park, Calif. 91306

[22] Filed: Aug. 19, 1974

[21] Appl. No.: 498,361

Related U.S. Application Data

[63] Continuation-in-part of Ser. No. 461,903, April 18, 1974, abandoned.

[52] U.S. Cl. .............................. 70/159; 220/24 GT
[51] Int. Cl.² .................. B65D 55/14; B65D 43/16
[58] Field of Search ............ 70/159, 160, 161, 162, 70/DIG. 57; 220/24 C, 24 GT

[56] References Cited
UNITED STATES PATENTS

| | | | |
|---|---|---|---|
| 1,538,295 | 5/1925 | Lyman et al. | 220/35 |
| 1,824,352 | 9/1931 | Isaacs | 70/161 |
| 1,902,456 | 3/1933 | Matthews | 70/159 |
| 1,944,535 | 1/1934 | White | 70/159 |

Primary Examiner—Paul R. Gilliam
Assistant Examiner—Alex Grosz
Attorney, Agent, or Firm—Robert E. Geauque

[57] ABSTRACT

The apparatus of this invention is designed to be employed in combination with a vehicle, the vehicle including therein a gasoline filler pipe, the filler pipe being normally closed by a gasoline cap. The apparatus of this invention relates to a separate locking apparatus which interfits over the gasoline cap of the vehicle, the locking apparatus including a key actuated locking mechanism which locks shut the apparatus housing and access to the gasoline cap is prevented.

20 Claims, 12 Drawing Figures

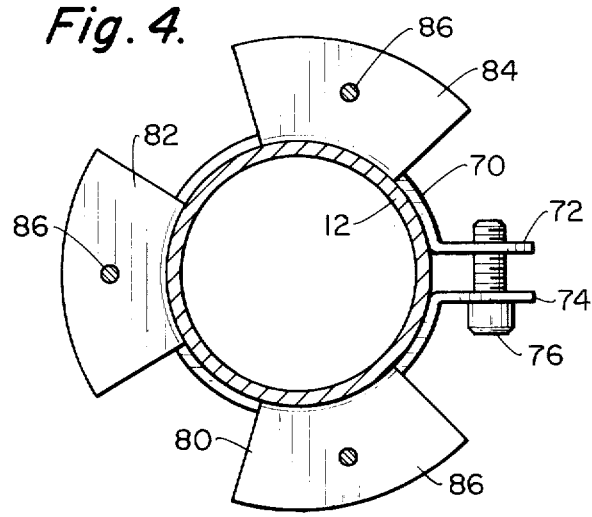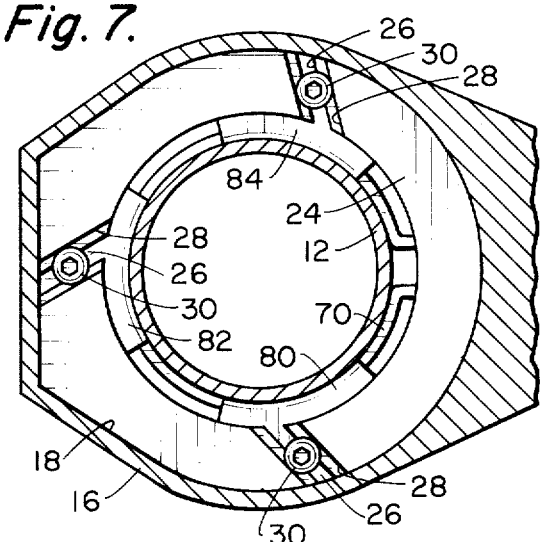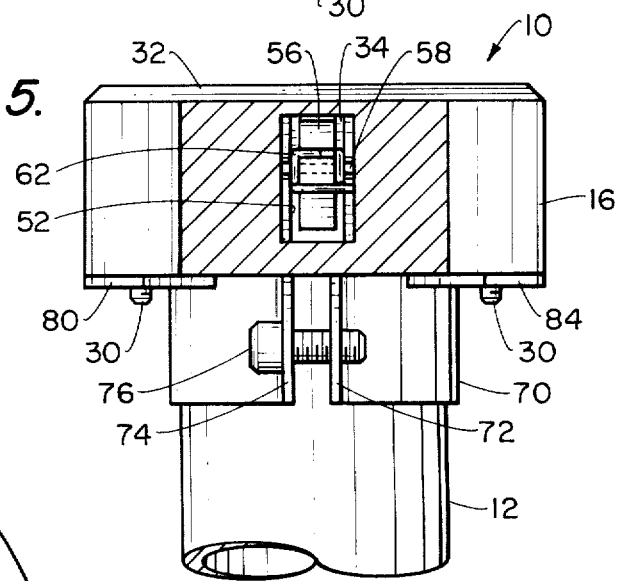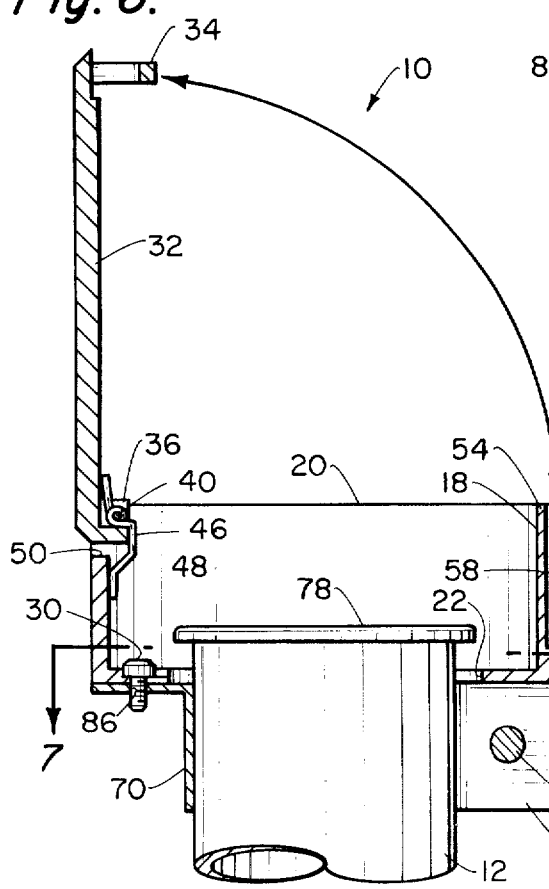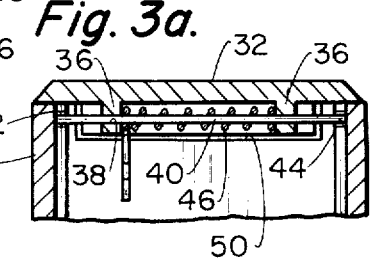

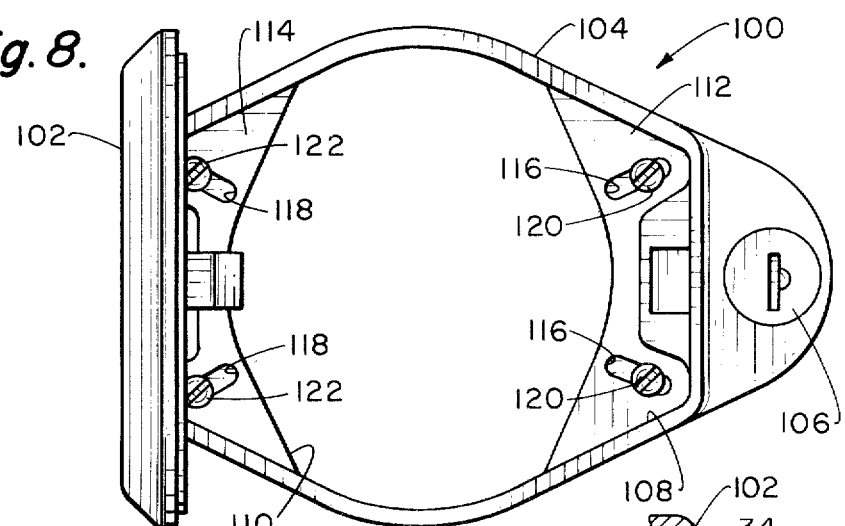
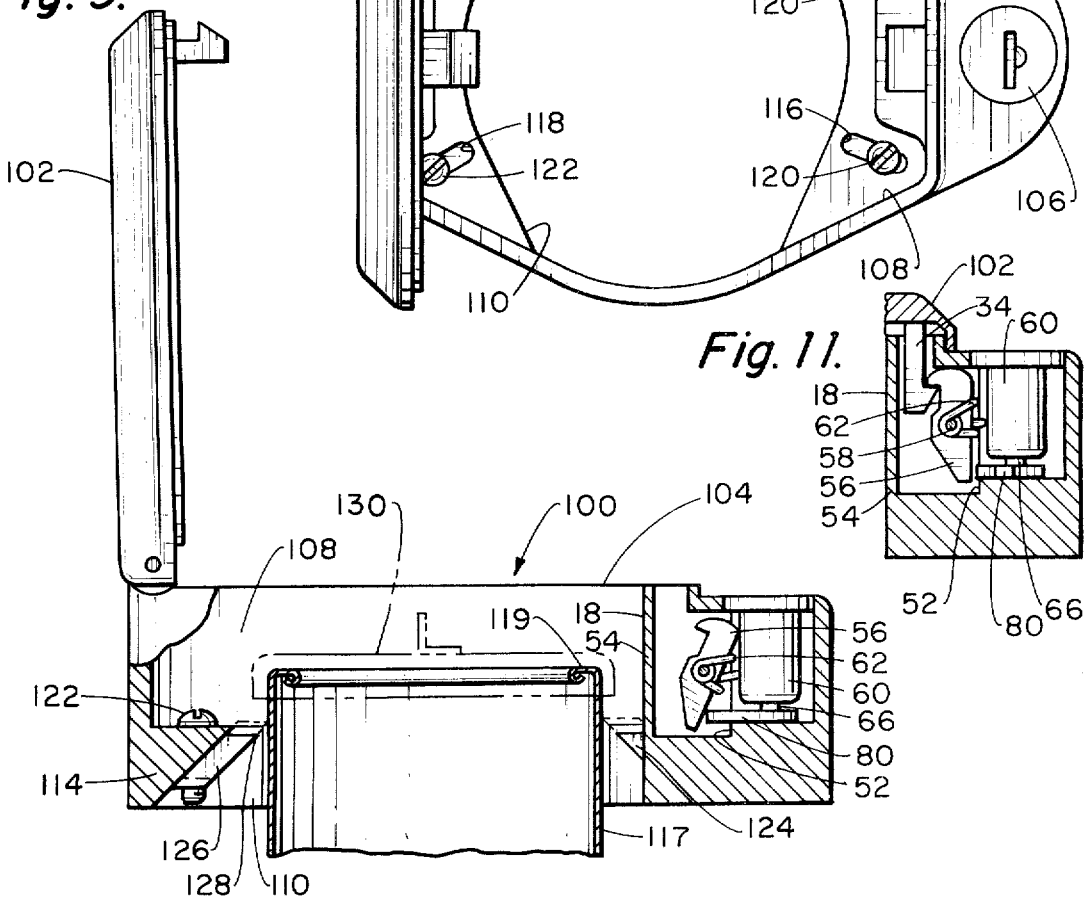
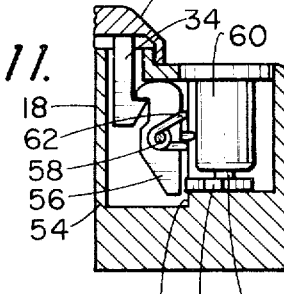
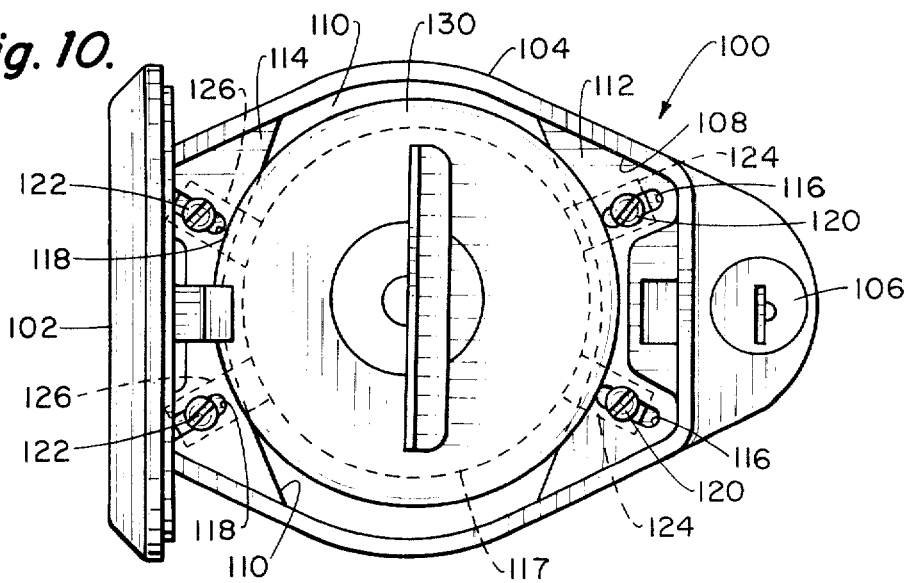

LOCKING APPARATUS FOR A GASOLINE FILLER PIPE

This application is a continuation-in-part of patent application Ser. No. 461,903, filed Apr. 18, 1974, now abandoned, entitled LOCKING APPARATUS FOR A GASOLINE FILLER PIPE by the present inventor.

BACKGROUND OF THE INVENTION

The field of this invention relates to locking devices and more particularly to a locking device for a vehicle gasoline filler pipe cap.

Gasoline, which is the most common fuel for operating vehicles, is rapidly becoming a commodity in short supply. Due to the shortness of supply, the cost of gasoline has substantially increased.

Because of these two factors, the unauthorized syphoning of gasoline from vehicles is becoming quite common. Almost all private and commercial vehicles employ a gasoline filler pipe within the vehicle which connects to the gasoline tank. The filler pipe is normally closed by a gasoline cap. It is not uncommon for a person to remove this gasoline cap and syphon gasoline from the gasoline tank.

In the past, there has been substantial effort expended on the designed of a structure which will prevent the unauthorized syphoning of gasoline from the vehicle. One such prior art apparatus is a spring which fits within the filler pipe. The spring will permit gasoline to be conducted into the gasoline tank but will prevent any syphoning hose from moving into the tank. However, such springs have been found to have one major disadvantage in that they tend to restrict the flow of fuel into the vehicle. As a result, it takes a substantial longer period of time to fill the gasoline tank of the vehicle than was previously required.

One other common type of prior art device is a gasoline cap which includes a key actuated locking mechanism. Such gasoline caps, because of the included locking mechanism, are quite expensive when compared to a conventional gasoline cap. As a result, there has never been a wide spread use of a gasoline cap which includes therein a key actuated locking device.

SUMMARY OF THE INVENTION

The locking apparatus of this invention comprises the use of a housing having an internal chamber therein. Within the housing there are first and second enlarged openings formed respectively within the upper side and the lower side of the housing. The cover is hingedly connected to the housing and is adapted to close off the first opening. A locking mechanism is mounted within the housing and cooperates with a latching pawl. The latching pawl connects with a catch mounted on the cover and is capable of holding the cover in a closed position. The lock is key actuated and is to move the latching pawl to permit the cover to be moved to an open position. The cover is continuously spring biased to the open position. A split band is mounted upon a fuel filler pipe adjacent the cap which normally is employed to close off the filler pipe. This split band includes adjustment means so as to cause the band to fit different diameters of filler pipes. An annular flange of the split band is attached to the underside of the housing about the second opening. In lieu of the split band, a wedging block assembly may be employed to securely bind the cap to the filler pipe.

The primary advantage of the structure of this invention is to prevent unauthorized access into the fuel tank of a vehicle thereby preventing syphoning of the fuel from the vehicle. The apparatus of this invention is employed in combination with the conventional non-locking gas cap for a fuel filler pipe. The apparatus of this invention is designed to fit most all diameters of filler pipes. The apparatus of this invention is designed so as to be extremely difficult to forcibly enter the apparatus or to break the apparatus. Previous locking types of caps have been extremely difficult to install and are quite complicated in construction wherein the structure of this invention is simple in construction and is relatively easy to operate. Also, the apparatus of this invention can be easily removed and reinstalled on another vehicle.

BRIEF DESCRIPTION OF THE DRAWINGS

FIG. 3A is a cross-sectional view taken along line 3A—3A of FIG. 3 showing in detail the hinge joint connection between the cover and the apparatus housing;

FIG. 4 is a cross-sectional view showing the split band of the first embodiment incorporated within the apparatus of this invention taken along line 4-4 of FIG. 1;

FIG. 5 is a cross-sectional view through the apparatus of this invention taken along line 5—5 of FIG. 3;

FIG. 6 is a view similar to FIG. 3 but showing the cover in the open position;

FIG. 7 is a cross-sectional view taken along line 7—7 of FIG. 6;

FIG. 8 is a plan view of the second embodiment of this invention showing the cover in the open position unconnected to a gasoline filler pipe with the wedge blocks in the fully retracted position;

FIG. 9 is a partial cross-sectional side view of the second embodiment of this invention;

FIG. 10 is a view similar to FIG. 8 but showing the cap in the installed position; and FIG. 11 is a sectional view showing the locking mechanism in the locked position.

DETAILED DESCRIPTION OF THE SHOWN EMBODIMENT

Figure 1:
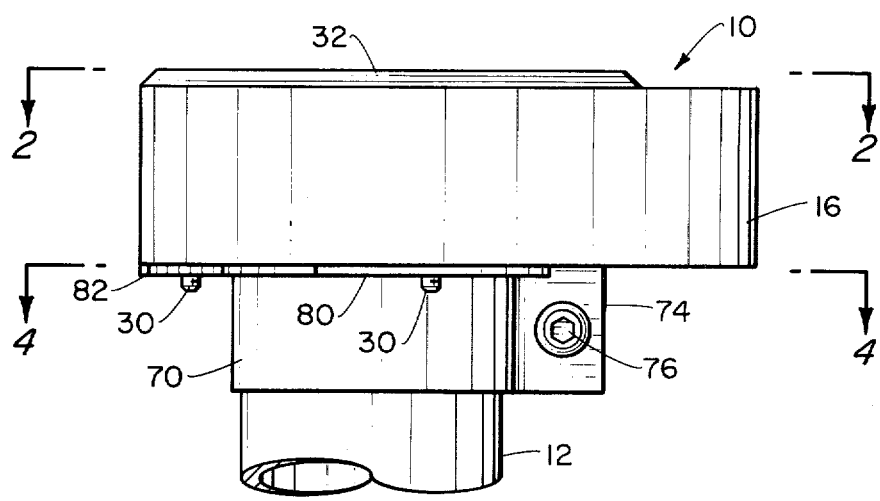
FIG. 1 is a side view of the first embodiment of the locking apparatus of this invention as it is mounted upon a fuel tank filler pipe.
Figure 2:
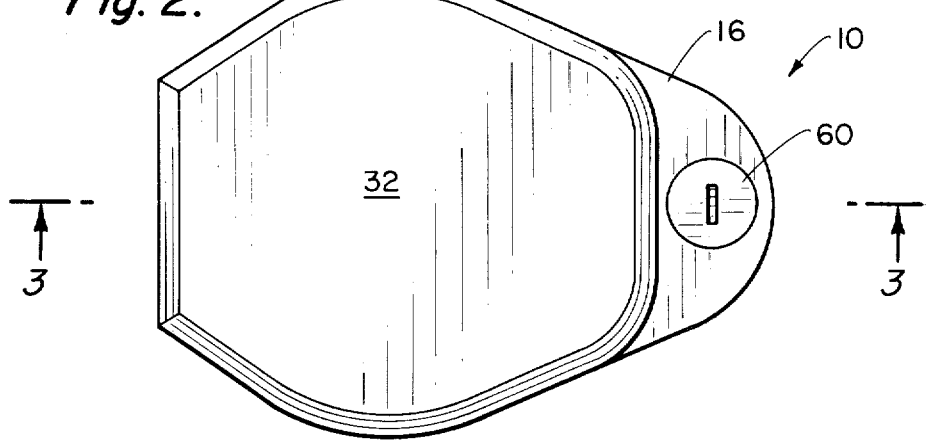
FIG. 2 is a top view of the apparatus of this invention taken along line 2—2 of FIG. 1.

Referring particularly to FIG. 1 of the drawings, there is shown the first embodiment of locking apparatus 10 of this invention which is mounted upon a fuel tank filler pipe 12. It is to be understood that the pipe 12 is connected to a fuel tank (not shown) and is provided for the purpose of filling the fuel tank with fuel. The pipe 12 is closed at its outermost end by means of a cap 14. The cap 14 can be any conventional type of cap.

The apparatus 10 includes housing 16 which includes an interior chamber 18. The chamber 18 is somewhat larger in size than the size of the gas cap 14. This is in order to facilitate entry of a person's hand within the chamber 18 and effect removal of the gas cap 14 and then subsequently replacement of the gas cap 14 upon filler pipe 12.

A first opening 20 is provided within the housing 16 through the upper surface thereof. Through the underside of the housing 16 is provided a second opening 22. Surrounding the opening 22 is formed an annular lip 24 which is formed as part of the under surface of the housing 16. Within the lip 24 are formed a plurality of fastener openings 26. These openings 26 are in the form of slots which are angularly located across the lip 24. Associated with each opening 26 is a channel 28 which is to provide for recessing of a screw fastener 30 so as to prevent the head of the fastener 30 from protruding above the upper surface of the lip 24. The reason for the provision of the inclination of the slots 26 is so that the housing 16 is capable of being connected to different sizes of filler pipes 12. For example, most filler pipes are within two different sizes which are one-fourth of an inch apart in diameter. The apparatus of this invention can readily accommodate either size of filler pipe.

A cover 32 is capable of closing the first opening 20. At the fore end of the cover 32 is attached a latching catch 34. At the aft end of the cover and attached to the inner side of the cover 32 and a pair of spaced apart mounts 36. Each mount 36 includes an aperture 38 formed therein. A rod 40 passes through both of the apertures 38 with the ends of the rod 40 extending within recesses 42 and 44 formed within the housing 16. A spring 46 is wound about the rod 40 and is positioned between the mounts 36. One end of the spring 46 connects with the cover 32 while the other end of the spring connects with the housing 16. The spring 46 exerts a continuous bias tending to pivot the cover 32 about the rod 40 to the open position.

Integrally secured to the cover 32 exteriorly of the mounts 36 is a depending flange 48. This flange 48 is to obscure from view the rod 40 and the spring 46. A person desiring to achieve unauthorized entry into the apparatus 10 of this invention could conceivably use a tool to break the hinge joint between the cover and the housing established by the rod 40. Therefore, by including of the depending flange 48, this is prevented.

The aft end of the housing 16 includes an enlarged recess 50 within which the depending flange 48 extends. The function of the recess 50 is so that the flange 48 will pivot within the recess 50 during opening and closing movement of the cover 32.

Figure 3:
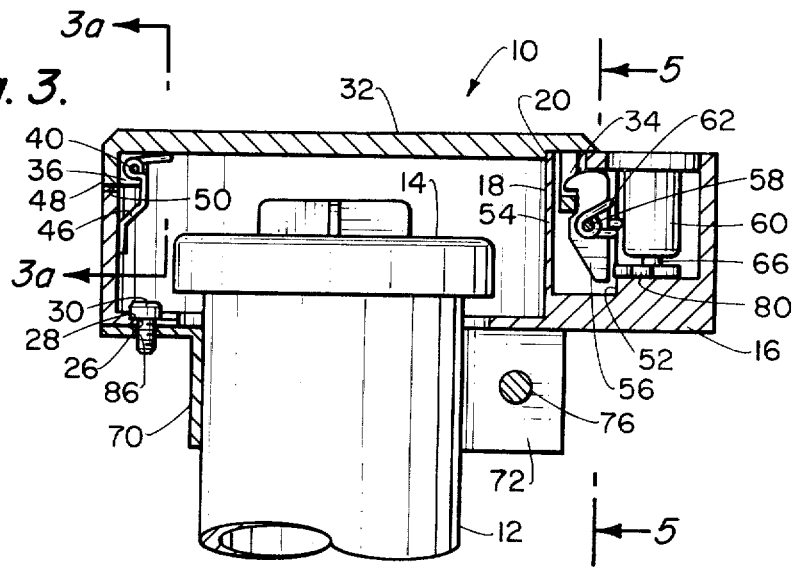
FIG. 3 is a cross-sectional view of the apparatus of this invention taken along line 3—3 of FIG. 2.

Formed within the housing 16 and located adjacent the chamber 18 is a lock chamber 52. This lock chamber 52 is separated from the chamber 18 by means of a partition 54. A locking pawl 56 has a pivot pin 58 mounted therethrough and the pivot pin 58 is rotatably mounted within recesses formed within portions of the housing 16 which constitute the end walls of the lock chamber 52. The locking pawl 56 is merely positioned with the pivot pin in these recesses and there is no specific structure holding the locking pawl in place with the exception of the location of the lock tumbler 60. This tumbler is positioned very near the pawl 56 and prevents this withdrawal movement out of the recesses in which it is mounted. A spring 62 is positioned about the pivot pin 58 and with one end of the pin 62 being against the latching pawl 56 with the other end resting against a portion of the housing 16. The spring 62 functions to bias the pawl 56 to the latched position at all times which is shown in FIG. 3 of the drawings.

The locking tumbler 60 may be of a special construction of can be of any conventional construction. The locking tumbler 60 is to be operated by means of a key 64. Once the proper key 64 is inserted and rotated, an elliptical shaped cam 80, attached to the tumbler 60 by rod 66, is rotated so that the large end of cam 80 moves against pawl 56. The latching pawl 56 is pivoted about the pin 58 from the latched position to the unlatched position shown in FIG. 6. This thereby releases the latching catch 34 and permits the cover 32 to pivot to the open position as shown in FIG. 6. The locking tumbler 60 is fixedly mounted to the housing 16 in a conventional manner and extends within the lock chamber 52.

Snugly mounted upon the filler pipe 12 is a split band 70. The split band 70 is formed into a pair of connecting flanges 72 and 74 through which a bolt fastener 76 extends. The fastener 76 will normally employ an Allen head type of fastener head which is operated by a conventional Allen wrench (not shown). By loosening of the fastener 76, the split band 70 can be passed over the annular lip 78 formed on the filler pipe 12. By tightening of the fastener 76, the band can then be tightly secured upon the filler pipe 12. Because of the adjustment feature inherent in this type of arrangement, the split band 70 can be employed to accommodate different sizes of filler pipes 12.

Attached to the band 70 is an annular flange assembly which comprises separate spaced apart flanges 80, 82 and 84. Each of these flanges 80, 82 and 84 include a fastener receiving opening 86. The fasteners 30 are to connect with the openings 86 in order to secure the housing 16 upon the flanges 80, 82 and 84. Therefore, the flanges are in contact with the lip 24. The spacing between the flanges 80, 82 and 84 provides ventilating area for the chamber 18. Therefore, any gas fumes which may enter chamber 18 are permitted to escape to the space between the flanges 80, 82 and 84.

To install the apparatus of this invention it is only necessary to locate the split band 70 upon the filler pipe 12 and tighten such tightly by means of an Allen wrench cooperating with the Allen head fastener 76. With the split band 70 tightly installed upon the filler pipe 12, the housing 16 is then placed so that the lip 24 comes into contact with the flanges 80, 82 and 84. The location of the housing 16 upon the lip 24 is so that slots 26 align with the fastener openings 86. When such is so aligned, the fasteners 30 are located within the alinged openings and installed tightly. The apparatus 10 of this invention is then ready for use and upon the cover 32 being closed, such cannot be opened without the using of the key 64 to disassociate the latching pawl 56 from the catch 34.

Referring in particular to FIGS. 8 to 11 of the drawings, there is shown a second embodiment 100 of the locking apparatus of this invention. The second embodiment 100 includes a cover 102 which is hingedly connected to a housing 104. Within the housing 104 is mounted a key actuated locking tumbler 106 which is to function as in the first embodiment to latch the cover 102 in a closed position about the housing 104.

Within the housing 104 is formed an interior chamber 108. An access opening 110 is provided within the lower side of the housing 104 which connects with the interior chamber 108.

Integrally formed with the housing 104 and extending within the interior chamber 108 is a forward ledge 112 and an aft ledge 114. The ledges 112 and 114 are on opposite sides of the chamber 108. The lower surface of the ledges 112 and 114 are inclined at a 45° angle with respect to the bottom surface of the housing 104.

Formed within the ledge 112 are a pair of elongated slots 116. Similarly formed within the ledge 114 are a pair of elongated slots 118. A screw fastener 120 is positioned within each of the slots 116. In a similar manner, a screw fastener 122 is positioned within each of the elongated slots 118.

Each of the screw fasteners 120 are secured to a wedge block 124 with it being understood that there are two in number of such wedge blocks 124. In a similar manner, each screw fastener 122 is connected to a respective wedge block 126 with it being understood that there are two in number of such wedge blocks 126. The wedge blocks 124 and 126 are each threadably connected to its respective fastener 120 or 122. Each of the blocks 124 and 126 are formed to include an inclined surface which is in abutting contact with the incline surface of the lower surface of its respective ledge 112 or 114. The forwardmost top 128 of each of the blocks 126 and 124 is formed serrated, the function of which will be explained further on in the specification.

The operation of the second embodiment 100 of this invention is as follows: Prior to installation, the screws 120 and 122 are loosened so that the body portion of each screw will rest within the outermost portion of its respective slot 116 and 118. The gas cap 130 is placed over the filler pipe 117. The screws 120 and 122 are then tightened which causes the wedge blocks 124 and 126 for that particular screw to be moved along the lower incline surface of its respective ledge 112 or 114. This movement is accomplished until all four wedge blocks 124 and 126 engage the gas filler pipe and are wedged against it securely. The serrated surface 128 of each wedge block bites into the filler pipe thereby facilitating secure interconnection therebetween and preventing unauthorized removal of the embodiment 100. The wedges are movable approximately five-eighths of an inch from its innermost position to its outermost position so therefore the wedges permit installation of the second embodiment 100 of this invention upon any conventionally known diameter of filler pipe. The front edge (surface 128) of each of the blocks may be straight or may be formed at some angle or may be arcuate.

Filler pipes normally have a turned-in bead 119. The amount of turned-in bead 119 controls the inner diameter of the pipe 117. In other words, the outer diameter of pipe 117 can be identical for all vehicles, but the inward extension of bead 119 can prohibit use with some gas filling nozzles. The structure of this invention will adapt to any inner diameter of filler pipe, as well as being adaptable to various outer diameter of filler pipes.

The advantage of the second embodiment 100 is that it can very easily secure the housing 104 to the filler pipe. While the cap is open, access for a screwdriver is readily facilitated through the open end of the housing 114 which is normally closed by the cover 102. The second embodiment 100 can be readily installed by practically any person, male or female. The structure of the second embodiment 100 avoids the use of an Allen wrench, which is required in the first embodiment 10. Also in this construction, no separate split ring is required as in the first embodiment.

Formed within the housing 104 and located adjacent the chamber 18 is a lock chamber 52. This lock chamber 52 is separated from the chamber 18 by means of a partition 54. A locking pawl 56 has a pivot pin 58 mounted therethrough and the pivot pin 58 is rotatably mounted within recesses formed within portions of the housing 104 which constitute the end walls of the lock chamber 52. The locking pawl 56 is merely positioned with the pivot pin in these recesses and there is no specific structure holding the locking pawl in place with the exception of the location of the lock tumbler 60. This tumbler 60 is positioned very near the pawl 56 and prevents this withdrawal movement out of the recesses in which it is mounted. A spring 62 is positioned about the pivot pin 58 and with one end of the pin 62 being against the latching pawl 56 with the other end resting against a portion of the housing 104. The spring 62 functions to bias the pawl 56 to the latched position at all times which is shown in FIG. 11 of the drawings.

The locking tumbler 60 may be of a special construction or can be of any conventional construction. The locking tumbler 60 is to be operated by means of a key 64. Once the proper key 64 is inserted and rotated, an elliptical shaped cam 80, attached to the tumbler 60 by rod 66, is rotated so that the large end of cam 80 moves against pawl 56. The latching pawl 56 is pivoted about the pin 58 from the latched position to the unlatched position shown in FIG. 9. This thereby releases the latching catch 34 and permits the cover 32 to pivot to the open position as shown in FIG. 9. The locking tumbler 60 is fixedly mounted to the housing 104 in a conventional manner and extends within the lock chamber 52.

What is claimed is:

1. A locking apparatus comprising:
   a housing having an internal chamber, a first opening and a second opening formed within said housing providing access into said chamber;
   a cover mounted by hinge means to said housing and movable between a closed position and an open position, said cover capable of closing said first opening when said cover is in said closed position, said open position providing access into said chamber, a latching catch attached to said cover;
   a split band adapted to surround a gas filler pipe, said band being adjustable to different diameters, said band including tightening means;
   a connecting flange attached to said band, said connecting flange attachable by fastening means to said housing about said second opening;
   a latching pawl pivotally mounted within said housing and movable between a latch position and an unlatch position, first biasing means attached to said latching pawl exerting a continuous bias tending to locate said pawl in said latched position, with said pawl in said latched position said pawl connects with said latching catch; and
   a key actuated lock mounted within said housing, said lock including structure capable of moving said pawl to said unlatched position.

2. Apparatus as defined in claim 1 wherein:
   a second biasing means mounted adjacent said hinge means of said cover, said second biasing means exerting a continuous bias tending to move said cover to said open position.

3. Apparatus as defined in claim 1 wherein:
   said cover including a depending flange, said depending flange exteriorly covering said hinge means.

4. Apparatus as defined in claim 1 wherein:

said connecting flange including a plurality of openings formed therein.

5. Apparatus as defined in claim 4 wherein:
said flange being formed of a plurality of separate spaced apart segments, said openings comprising said spaces between said segments.

6. Apparatus as defined in claim 1 wherein:
said latching pawl being mounted by a pivot pin within recesses formed within said housing and located in an established position, the location of said lock being such to prevent withdrawal of said latching pawl from said established position.

7. In combination with a fuel tank, said fuel tank having a filler pipe, the open end of said filler pipe being closeable by a cap, a locking apparatus to connect with said filler pipe and prevent unauthorized access to said cap, said locking apparatus comprising:
a housing having an internal chamber, a first opening and a second opening formed within said housing providing access into said chamber;
a cover mounted by hinge means to said housing movable between a closed position and an open position, said cover capable of closing said first opening when said cover is in said closed position, said open position providing access into said chamber, a latching catch attached to said cover;
a split band adapted to surround a gas filler pipe, said band bing adjustable to different diameters, said band including tightening means;
a connecting flange attached to said band, said connecting flange attachable by fastening means to said housing about said second opening;
a latching pawl pivotally mounted within said housing and movable between a latched position and an unlatched position, first biasing means attached to said latching pawl exerting a continuous bias tending to locate said pawl in said latched position, with said pawl in said latched position said pawl connects with said latching catch; and
a key actuated lock mounted within said housing, said lock including structure capable of moving said pawl to said unlatched position.

8. The combination as defined in claim 7 wherein:
a second biasing means mounted adjacent said hinge means of said cover, said second biasing means exerting a continuous bias tending to move said cover to said open position.

9. The combination as defined in claim 7 wherein:
said cover including a depending flange, said depending flange exteriorly covering said hinge means.

10. The combination as defined in claim 7 wherein:
said connecting flange including a plurality of openings formed therein.

11. The combination as defined in claim 10 wherein:
said flange being formed of a plurality of separate spaced apart segments, said openings comprising said spaces between said segments.

12. The combination as defined in claim 7 wherein:
said latching pawl being mounted by a pivot pin within recesses formed within said housing and located in an established position, the location of said lock being such to prevent withdrawal of said latching pawl from said established position.

13. A locking apparatus comprising:
a housing having an internal chamber, a first opening and a second opening formed within said housing providing access into said chamber;
a cover mounted by hinge means to said housing and movable between a closed position and an open position, said cover capable of closing said first opening when said cover is in said closed position, said open position providing access into said chamber, a latching catch attached to said cover;
locking means mounted on said housing which includes a movable pawl to connect with said latching catch of said cover when in the closed position upon said housing, actuating means for moving said movable pawl; and
attaching means connected to said housing for connecting said housing to a gasoline filler pipe, said attaching means including means adjustable to accommodate different diameters of gasoline filler pipes.

14. A locking apparatus as defined in claim 13 wherein:
said attaching means comprising at least one movable member, said movable member being slidable upon an inclined surface formed on a portion of said housing, fastening means interconnecting said movable member and said housing portion, whereby as said fastening means is tightened said movable member is moved toward an engagement with said filler pipe, whereby as said fastening means is loosened said movable member is moved away from said filler pipe.

15. The locking apparatus as defined in claim 14 wherein:
there being a plurality of said movable members slidable on inclined surfaces of housing portions located in a spaced apart manner and a plurality of fastening means, each one of said movable members being interconnected to one of said housing portions by one of said fastening means for separate movement of said members toward an engagement with said filler pipe.

16. A locking apparatus as defined in claim 15 wherein each of said movable members has a sharp pipe engaging portion positioned closest to said filler pipe, said portion tightly engaging said filler pipe upon tightening of the interconnecting fastening means.

17. A locking apparatus as defined in claim 14 wherein said fastening means comprises a threaded fastener member passing through said housing portion and threaded into said movable member, said attaching means comprising slot means transversed by said fastener member and permitting relative movement between said movable member and said inclined surface upon rotation of said fastener member.

18. A locking apparatus as defined in claim 13 wherein said actuating means comprises a key-actuated lock mounted within said housing for selectively engaging said latching catch to lock said cover in the closed position.

19. A locking apparatus comprising:
a housing having an internal chamber, a first opening and a second opening formed within said housing providing access into said chamber;
a cover mounted by hinge means to said housing and movable between a closed position and an open position, said cover capable of closing said first opening when said cover is in said closed position, said open position providing access into said chamber, a latching catch attached to said cover;
locking means mounted on said housing which includes a movable pawl to connect with said latching catch of said cover when in the closed position upon said housing, actuating means for moving said movable pawl;

attaching means connected to said housing for connecting said housing to a gasoline filler pipe, said attaching means including means adjustable to accommodate different diameters of gasoline filler pipes; and said attaching means comprises a wedge assembly, said wedge assembly including at least one wedge member movable upon an incline surface formed upon said housing, threaded fastening means interconnecting said wedge member and said housing, whereby as said threaded fastening means is tightened said wedge member is moved toward an engagement with the filler pipe, whereby as said threaded fastening means is loosened said wedge member is moved away from said filler pipe.

20. A locking apparatus comprising:

a housing having an internal chamber, a first opening and a second opening formed within said housing providing access into said chamber;

a cover mounted by hinge means to said housing and movable between a closed position and an open position, said cover capable of closing said first opening when said cover is in said closed position, said open position providing access into said chamber, a latching catch attached to said cover;

locking means mounted on said housing which includes a movable pawl to connect with said latching catch of said cover when in the closed position upon said housing, actuating means for moving said movable pawl;

attaching means connected to said housing for connecting said housing to a gasoline filler pipe, said attaching means including means adjustable to accommodate different diameters of gasoline filler pipes;

said attaching means comprises a wedge assembly, said wedge assembly including at least one wedge member movable upon an incline surface formed upon said housing, threaded fastening means interconnecting said wedge member and said housing, whereby as said threaded fastening means is tightened said wedge member is moved toward an engagement with the filler pipe, whereby as said threaded fastening means is loosened said wedge member is moved away from said filler pipe; and there being four in number of said wedge members with a said fastening means being individually connected to each said wedge member.

* * * * *